United States Patent
Yao et al.

(10) Patent No.: US 11,961,485 B2
(45) Date of Patent: Apr. 16, 2024

(54) CHOLESTERIC LIQUID CRYSTAL DISPLAY, LIQUID CRYSTAL DRIVING UNIT, AND DRIVING METHOD

(71) Applicant: IRIS OPTRONICS CO., LTD., Tainan (TW)

(72) Inventors: Cheng-Hung Yao, Tainan (TW); Chi-Chang Liao, Tainan (TW)

(73) Assignee: IRIS OPTRONICS CO., LTD., Tainan (TW)

( * ) Notice: Subject to any disclaimer, the term of this patent is extended or adjusted under 35 U.S.C. 154(b) by 0 days.

(21) Appl. No.: 18/133,493

(22) Filed: Apr. 11, 2023

(65) Prior Publication Data
US 2023/0335072 A1 Oct. 19, 2023

(30) Foreign Application Priority Data
Apr. 18, 2022 (TW) .................................. 111114645

(51) Int. Cl.
| | |
|---|---|
| *G09G 3/36* | (2006.01) |
| *G02F 1/13* | (2006.01) |
| *G02F 1/137* | (2006.01) |
| *G09G 3/20* | (2006.01) |

(52) U.S. Cl.
CPC ............. *G09G 3/36* (2013.01); *G02F 1/1309* (2013.01); *G02F 1/137* (2013.01); *G09G 3/2096* (2013.01); *G09G 2320/041* (2013.01); *G09G 2330/021* (2013.01)

(58) Field of Classification Search
CPC ........ G02F 1/137; G09G 3/2096; G09G 3/36; G09G 2330/021
See application file for complete search history.

(56) References Cited

U.S. PATENT DOCUMENTS

| | | | |
|---|---|---|---|
| 2008/0284712 A1 | 11/2008 | Muto et al. | |
| 2009/0066628 A1* | 3/2009 | Uehara | G09G 3/3622 345/101 |
| 2013/0083086 A1* | 4/2013 | Nose | G09G 3/3651 345/212 |

FOREIGN PATENT DOCUMENTS

TW 201314650 A1 4/2013

* cited by examiner

*Primary Examiner* — Sanghyuk Park
(74) *Attorney, Agent, or Firm* — Cheng-Ju Chiang

(57) ABSTRACT

The present invention relates to a cholesteric liquid crystal display, a liquid crystal driving unit, and a driving method for reducing the maximum driving voltage. The cholesteric liquid crystal display comprises a cholesteric liquid crystal display panel, a temperature detecting device, and a liquid crystal driving unit. If the temperature detecting device detects a temperature below the optimal range for the cholesteric liquid crystal display panel, the liquid crystal driving unit will operate the cholesteric liquid crystal display panel in DDS timing mode. When the temperature detecting device detects that the temperature of the display panel exceeds the optimal temperature range, the liquid crystal driving unit will operate the display panel in PWM timing mode, which can solve the problem of increased power consumption caused by changes in ambient temperature, and can greatly improve the better color level.

13 Claims, 10 Drawing Sheets

|  | Driving Phase | 0°C | 25°C | 35°C |
|---|---|---|---|---|
| PWM Timing Mode | Reset (60ms) | 44 | 40 | 36 |
|  | Selection (4ms/line) | 26 | 20 | 16 |
|  | Non-selection | 6.5 | 5 | 4 |
| DDS Timing Mode | Preparation (20ms) | 35 | 40 | 46 |
|  | Selection (1ms/line) | 11 | 12 | 13 |
|  | Evolution (10ms) | 15 | 19 | 27 |
|  | Non-selection | 6 | 6 | 6 |

Voltage (V)

Fig. 8

| | Driving Phase | -2°C | 0°C | 5°C | 25°C | 35°C | |
|---|---|---|---|---|---|---|---|
| PWM Timing Mode | Reset (40ms) | 44 | 44 | 43 | 40 | 36 | Voltage (V) |
| | Selection (4ms/line) | 26 | 26 | 25 | 20 | 16 | |
| | Non-selection | 6.6 | 6.5 | 6.2 | 5 | 4 | |
| DDS Timing Mode | Preparation (20ms) | x | 35 | 36 | 40 | 46 | |
| | Selection (1ms/line) | x | 11 | 11 | 12 | 13 | |
| | Evolution (10ms) | x | 15 | 16 | 19 | 27 | |
| | Non-selection | x | 6 | 6 | 6 | 6 | |

Fig. 9

CHOLESTERIC LIQUID CRYSTAL DISPLAY, LIQUID CRYSTAL DRIVING UNIT, AND DRIVING METHOD

BACKGROUND OF THE INVENTION

1. Field of the Invention

The present invention relates to a cholesteric liquid crystal display (ChLCD) with multiple timing modes, a cholesteric liquid crystal driving unit, and a driving method, and in particular, to a cholesteric liquid crystal display (ChLCD) in a DDS timing mode and a PWM timing mode to display images, a cholesteric liquid crystal driving unit, and a driving method for the cholesteric liquid crystal display (ChLCD).

2. Description of Related Art

A cholesteric liquid crystal display (ChLCD) has bi-stable characteristic, and the ChLCD can save power by maintaining the screen or information without requiring an electric field to be applied. The ChLCD technology can be applied at a temperature display board, an E-Book, an E-Paper, and an electronic whiteboard, etc.

Active area of the ChLCD device is called a display panel which can be activated by a DSS (Dynamic Driving Scheme) timing mode or a PWM (Pulse-Width Modulation) timing mode. Generally, a display panel can be driven by only one timing mode, such as either the DSS or PWM timing mode.

The DDS timing mode is a method of driving the cholesteric liquid crystal in a ChLCD. This method is used to take advantage of the fast switching speed between the Homeotropic state and the Transient state, as well as the hysteresis between the Focal-conic state and the Homeotropic state. It's what so called three-state driving scheme which includes a Preparation Phase, a Selection Phase, and an Evolution Phase. The Preparation Phase is used to switch the orientation of the cholesteric liquid crystal molecule into the Homeotropic state, while the Selection Phase is used to select either the Focal-conic state (opaque state) or the Planar state (transparent state). If the cholesteric liquid crystal molecule is switched to the Planar state (transparent state), the Homeotropic state must be maintained. However, if it is switched to the Focal-conic state (opaque state), the Transient state must be maintained. The Evolution Phase utilizes the hysteresis between Homeotropic and Focal-conic to switch between the Planar state (transparent state) and the Focal-conic state (opaque state) to achieve fast driving.

However, when the ChLCD is addressed by the DDS timing mode, higher ambient temperatures can result in increased power consumption and higher driving voltages, which require more expensive drive ICs.

Furthermore, under high ambient temperatures, addressing the ChLCD with the DDS timing mode can lead to limited color scales and inaccurate image display. Although the DDS timing mode has advantages, such as fast response, its disadvantages under high temperatures can be detrimental to the ChLCD.

For the differences between temperature and voltage in DDS timing mode, please refer to FIGS. 1-3. FIG. 1 illustrates a schematic diagram of the voltage and reflectivity of Selection Phase and Evolution Phase at 0° C. FIG. 2 is a schematic diagram of the voltage and reflectivity of Selection Phase and Evolution Phase at 25° C. FIG. 3 is a schematic diagram of the voltage and reflectivity of Selection Phase and Evolution Phase at 35° C. In FIGS. 1-3, the color blocks correspond to different reflectivity levels. Darker orange-red blocks indicate the transparent state of the cholesteric liquid crystal, and correspond to higher gray scale values in the ChLCD. On the other hand, darker blue blocks indicate the opaque state of the cholesteric liquid crystal, and correspond to lower gray scale values in the ChLCD.

As shown in FIG. 1, the Evolution Phase at 0° C. shows a voltage of 14 volts (V), while the Selection Phase displays a range of color scales from 0 volts (V) to 20 volts (V) visible to the right. FIG. 1 also illustrates an ideal distribution of various reflectivities. As shown in FIG. 2, the Evolution Phase at 25° C. shows a voltage of 18 volts (V), while the Selection Phase displays a range of color scales from 0 volts (V) to 20 volts (V) visible to the right. FIG. 2 also illustrates an ideal distribution of various reflectivities. As shown in FIG. 3, the Evolution Phase at 35° C. shows a voltage of 18 volts (V), while the Selection Phase displays a range of color scales from 0 volts (V) to 20 volts (V) visible to the right. FIG. 3 also illustrates an ideal distribution of various reflectivities.

The desired voltage for the Evolution Phase varies with temperature. At 0° C., the ideal voltage is 14 V; at 25° C., it's 18 V; and at it's 20 V. The higher the voltage required, the more expensive the ChLCD due to the need for a driver chip with a higher maximum driving voltage.

Therefore, to overcome disadvantages mentioned above such as limited color scale and higher power consumption while the cholesteric liquid crystal display device is addressed by the DDS timing mode, a solution to the disadvantages mentioned above is necessary.

SUMMARY OF THE INVENTION

The present invention provides a cholesteric liquid crystal display (ChLCD) with multiple timing modes such as a DDS (Dynamic Driving Scheme) timing mode and a PWM (Pulse-Width Modulation) timing mode, a cholesteric liquid crystal driving unit, and a driving method to overcome higher power consumption with higher ambient temperature and display better color scales.

The present invention provides a cholesteric liquid crystal display (ChLCD) with multiple timing modes so as to lower maximum driving voltages, and the ChLCD of the present invention includes a ChLCD panel, a temperature detecting device, and a cholesteric liquid crystal driving unit.

According to the present invention, the ChLCD panel is used to display images, the temperature detecting device responsible for sensing the temperature of the ChLCD panel, and the cholesteric liquid crystal driving unit is used to supply driving voltages to drive the ChLCD panel and display images. The cholesteric liquid crystal driving unit may be integrated into a timing controller (TCON) chip.

While the temperature detecting device detects that the temperature of the ChLCD panel is lower than the preset optimal temperature range, the cholesteric liquid crystal driving unit will drive the ChLCD panel by a DDS timing mode. Besides, while the temperature detecting device detects the temperature of the ChLCD panel is higher than the preset optimal temperature range, the cholesteric liquid crystal driving unit will drive the ChLCD panel by a PWM timing mode.

According to the ChLCD panel mentioned above, the optimal temperature range is in a range of 25 (° C.) to 35 degrees Celsius (° C.).

Furthermore, one specific temperature may be designated as an optimal temperature in the range of the optimal temperature range mentioned above. For instance, the optimal temperature is 30° C.

The present invention also provides a cholesteric liquid crystal driving unit with multiple timing modes for reducing maximum driving voltages of the ChLCD, and the cholesteric liquid crystal driving unit may be also integrated into a timing controller (TCON) chip.

The ChLCD mentioned above includes a ChLCD panel for displaying image, and a temperature detecting device for sensing the temperature of the ChLCD panel. The cholesteric liquid crystal driving unit is used to supply driving voltages to drive the ChLCD panel for displaying images, and further includes a DDS driving module, and a PWM driving module.

If the temperature detecting device detects a temperature of the ChLCD panel below the preset optimal temperature range, the DDS driving module will drive the ChLCD panel by the DDS timing module.

If the temperature detecting device detects a temperature on the ChLCD panel that exceeds the preset optimal temperature range, the PWM driving module will drive the ChLCD panel by the PWM timing module.

According to the present invention, while the temperature on the ChLCD panel is high, the maximum driving voltage for driving the ChLCD panel in PWM timing module is low. Despite low temperature on the ChLCD panel, the maximum driving voltage for driving the display panel in DDS timing module is still low. Thus, the ChLCD panel is driven by the cholesteric liquid crystal driving unit which utilizes a timing controller (TCON) chip of the present invention to control the voltage applied to the ChLCD panel, ensuring that the maximum driving voltage remains within safe limits. Cost for purchasing the timing controller (TCON) chip is significantly lower.

To be specific, as to the cholesteric liquid crystal driving unit mentioned above, the optimal temperature range is in the range from 25 to 35° C.

Furthermore, one specific temperature may be designated as an optimal temperature in the range of the optimal temperature range mentioned above. For instance, the optimal temperature is in the range from 30 to 30° C.

Aside from the above-mentioned ChLCD panel with multiple timing modes and the cholesteric liquid crystal driving unit, the present invention also includes a driving method with multiple timing modes. The driving method of the present invention for reducing the maximum optimal driving voltages of the ChLCD panel includes the steps as follows.

Firstly, the temperature of the ChLCD panel is required so the temperature detecting device is utilized to measure the temperature of the ChLCD panel.

If the temperature of the ChLCD panel is below the preset optimal temperature range, the DDS driving module will drive the ChLCD in the DDS timing module.

If the temperature on the ChLCD panel exceeds the optimal temperature range, the PWM driving module will drive the display panel in the PWM timing module.

The maximum optimal temperature range may be in the range from 25 to 35° C., and one specific temperature may be designated as an optimal temperature in the range of the optimal temperature range mentioned above. For instance, the optimal temperature is in the range from 30 to 30° C.

While the temperature is high, the maximum driving voltage for driving the ChLCD panel in PWM timing module is low. Despite low temperature on the display panel, the maximum operating driving voltage for driving the display panel in DDS timing module is still low. Thus, the ChLCD panel of the present invention is driven by the cholesteric liquid crystal driving unit which utilizes a timing controller (TCON) chip to control the voltage applied to the display panel, ensuring that the maximum driving voltage remains within safe limits. Cost for purchasing the timing controller (TCON) chip is significantly lower.

Therefore, the present invention provides a cholesteric liquid crystal display (ChLCD) with multiple timing modes, a cholesteric liquid crystal driving unit, and a driving method. By checking the detected temperature on the ChLCD and the optimal temperature range, the ChLCD may be driven by choosing the DDS timing modes or the PWM timing mode so as to overcome high power consumption caused by high temperature and improve color scale accuracy of the ChLCD.

The aforementioned illustrations are exemplary for the purpose of further explaining the scope of the present invention. Other objectives and advantages related to the present invention will be illustrated in the subsequent descriptions and appended drawings.

BRIEF DESCRIPTION OF THE DRAWINGS

The foregoing features may be combined with the following drawings in various combinations without exclusivity, unless expressly indicated otherwise. Apparently, descriptions of drawings in the following may be some of embodiments of the present invention, those of ordinary skill in the art may derive other drawings based on the following drawings without unduly experiments.

FIG. 8 is a comparison table of the DDS timing mode and the PWM timing mode at different temperatures in the present invention;

FIG. 9 is a comparison table of the DDS timing mode and the PWM timing mode at different temperatures according to another embodiment of the present invention.

DETAILED DESCRIPTION OF THE PREFERRED EMBODIMENTS

The aforementioned constructions and associated functions and following detailed descriptions are exemplary for the purpose of further explaining the scope of the present invention. Other objectives and advantages related to the present invention will be illustrated in the subsequent descriptions and appended drawings. Furthermore, the present invention may be embodied in various modifications, and descriptions and illustrations are not-limiting.

Figure 4:
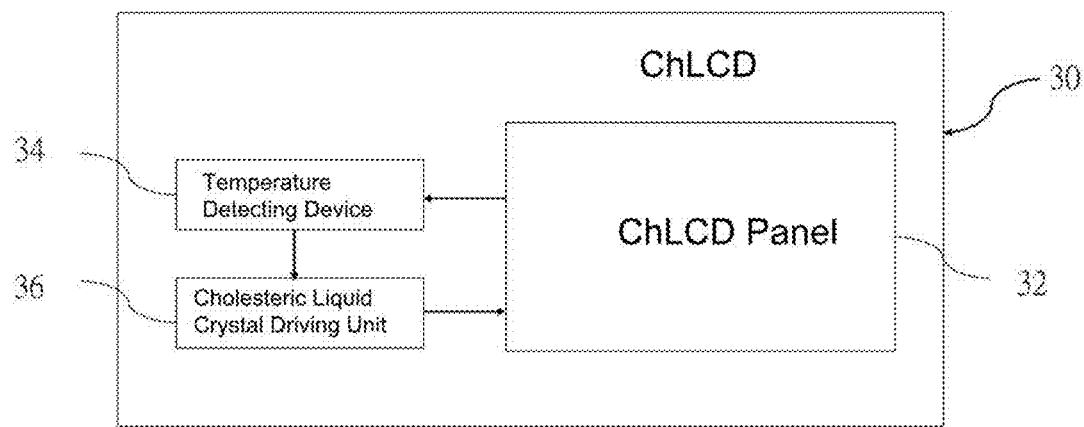
FIG. 4 is a schematic of components of the cholesteric liquid crystal display (ChLCD) with multiple timing modes according to the present invention.

The present invention provides a cholesteric liquid crystal display (ChLCD) that features with multiple timing modes, a cholesteric liquid crystal driving unit, and a driving method for the ChLCD, and the different timing modes are designated to reduce the maximum driving voltages. Referring to FIG. 4, it illustrates a schematic of components of the cholesteric liquid crystal display (ChLCD) with multiple timing modes according to the present invention. This embodiment relates to a cholesteric liquid crystal display (ChLCD) 30 with multiple timing modes, which aims to display images with lower maximum driving voltage. The ChLCD 30 consists of a cholesteric liquid crystal display (ChLCD) panel 32, a temperature detecting device 34, and a cholesteric liquid crystal driving unit 36.

The ChLCD panel 32 has a plurality of pixel matrix for displaying images. In addition to the temperature affecting the driving voltage, the temperature and driving voltages can also affect the response speed, light-dark contrast and color scale change.

The temperature detecting device 34 is used to sense the temperature of the ChLCD panel 32. After the temperature detecting device 34 determines the temperature of the ChLCD panel 32 and the ambient temperature, based on different ambient temperatures, the cholesteric liquid crystal driving unit 36 drives the ChLCD panel 32 in different timing modes.

The cholesteric liquid crystal driving unit 36 supplies row and column driving voltages to the ChLCD panel 32 through either the (DDS (Dynamic Driving Scheme) timing mode or the PWM (Pulse-Width Modulation) timing mode to display images. When the temperature detecting device 34 determines that the temperature of the ChLCD panel 32 is lower than preset optimal temperature range, the cholesteric liquid crystal driving unit 36 will drive the ChLCD panel 32 in the DDS timing mode. When the temperature detecting device 34 determines that the temperature of the ChLCD panel 32 exceeds the preset optimal temperature range, the cholesteric liquid crystal driving unit 36 will drive the ChLCD panel 32 in the PWM timing mode.

Figure 5:
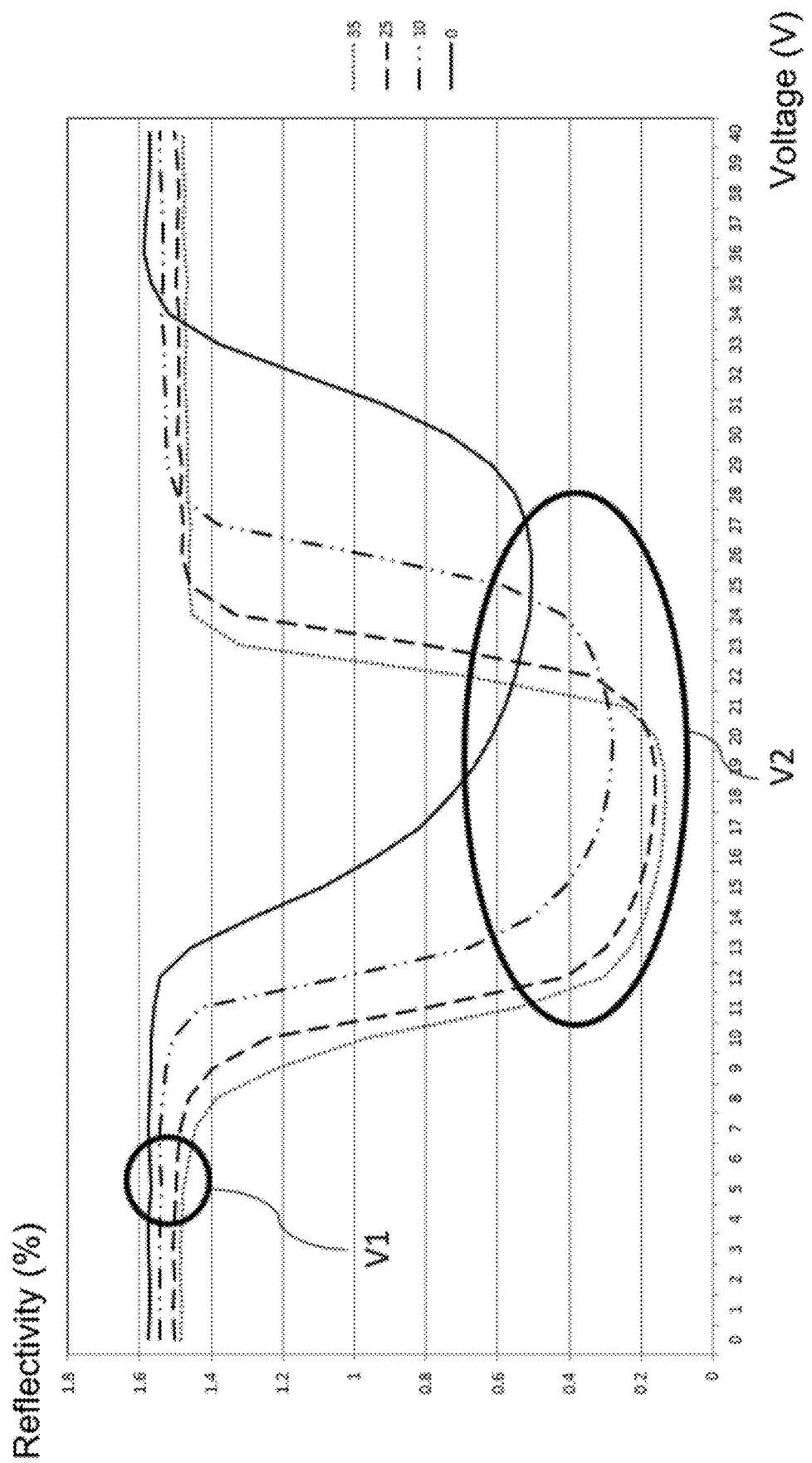
FIG. 5 is a curve diagram, showing how the Reflectivity versus Voltage (R-V) value changes of the cholesteric liquid crystal molecules in PWM timing mode according to the present invention.

Referring to FIG. 5, it illustrates a curve diagram, showing how the Reflectivity versus Voltage (R-V) value changes of the cholesteric liquid crystal molecules with the PWM timing mode according to the present invention. As shown in FIG. 5, the x-axis (abscissa) is labeled "R" and represents reflectivity, while the y-axis (ordinate) is labeled "V" and represents voltages. The four curves of FIG. 5 illustrate how the reflectivity of the cholesteric liquid crystal drive unit 36 varies with the voltage at the temperature 0° C., 10° C., 25° C., and 35° C., respectively. The relationship between reflectivity and voltages of the cholesteric liquid crystal drive unit 36 is: a high reflectivity corresponds to the transparent state and a low reflectivity corresponds to the opaque state. V1 is the voltage range used when the PWM timing mode is in use and the liquid crystal molecules are in transparent state, and V2 is the voltage range used when the PWM timing mode is in use and the liquid crystal molecules are in opaque state. As shown in FIG. 5, the voltage of the opaque state is higher at temperature of 0 degree Celsius (° C.), and about 25 volts (V), and the voltage of the opaque state is lower at temperature of 35° C., and about 17 volts (V). Thus, it can be determined that in the PWM timing mode, when the temperature is lower, the required voltage is higher, and when the temperature is higher, the required voltage is lower.

Figure 1:
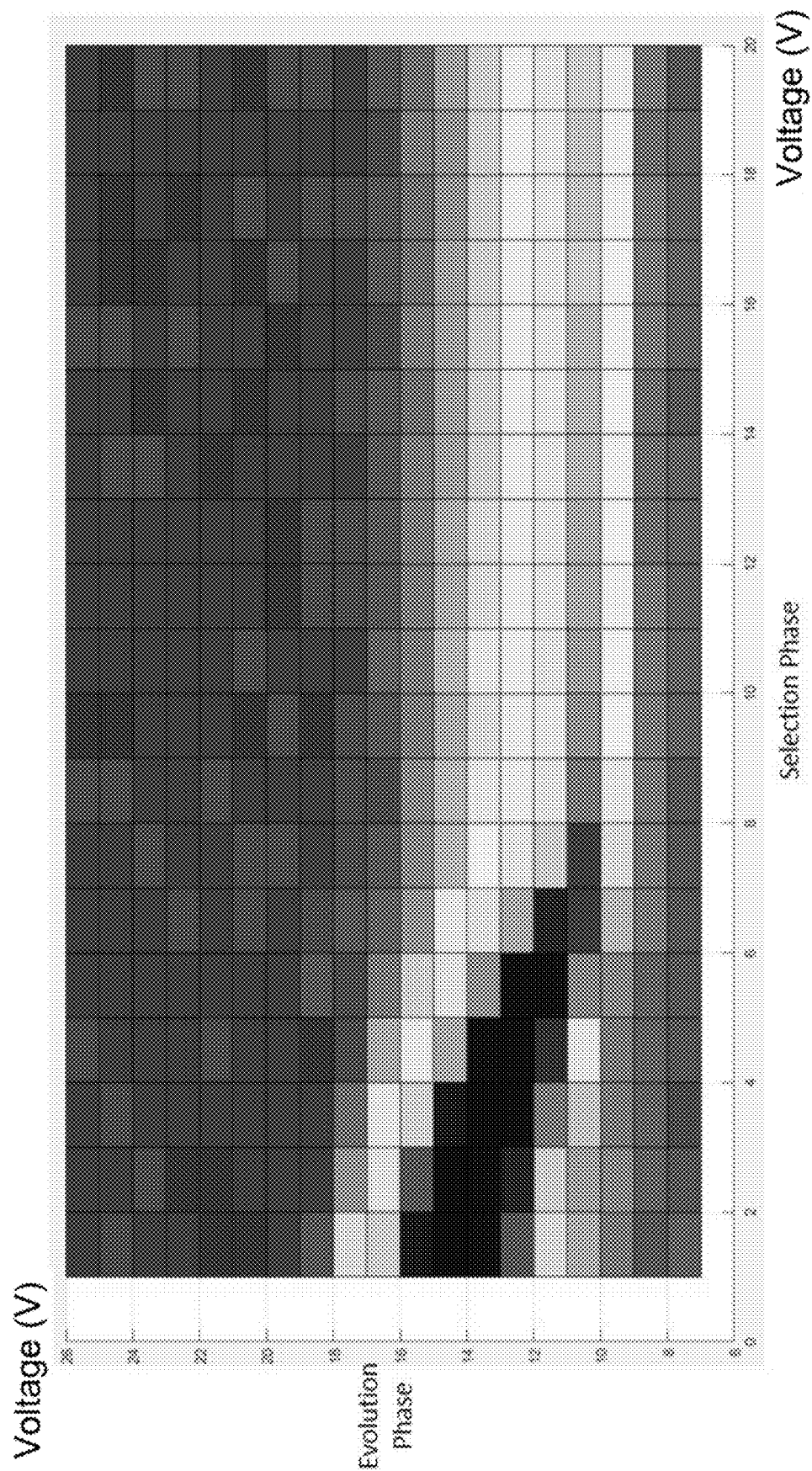
FIG. 1 is a schematic diagram of showing how driving voltages and reflectivity of the cholesteric liquid crystal display (ChLCD) change based on the Selection Phase and the Evolution Phase driving schemes while the ambient temperature is zero degree Celsius (° C.) in the prior art.
Figure 2:
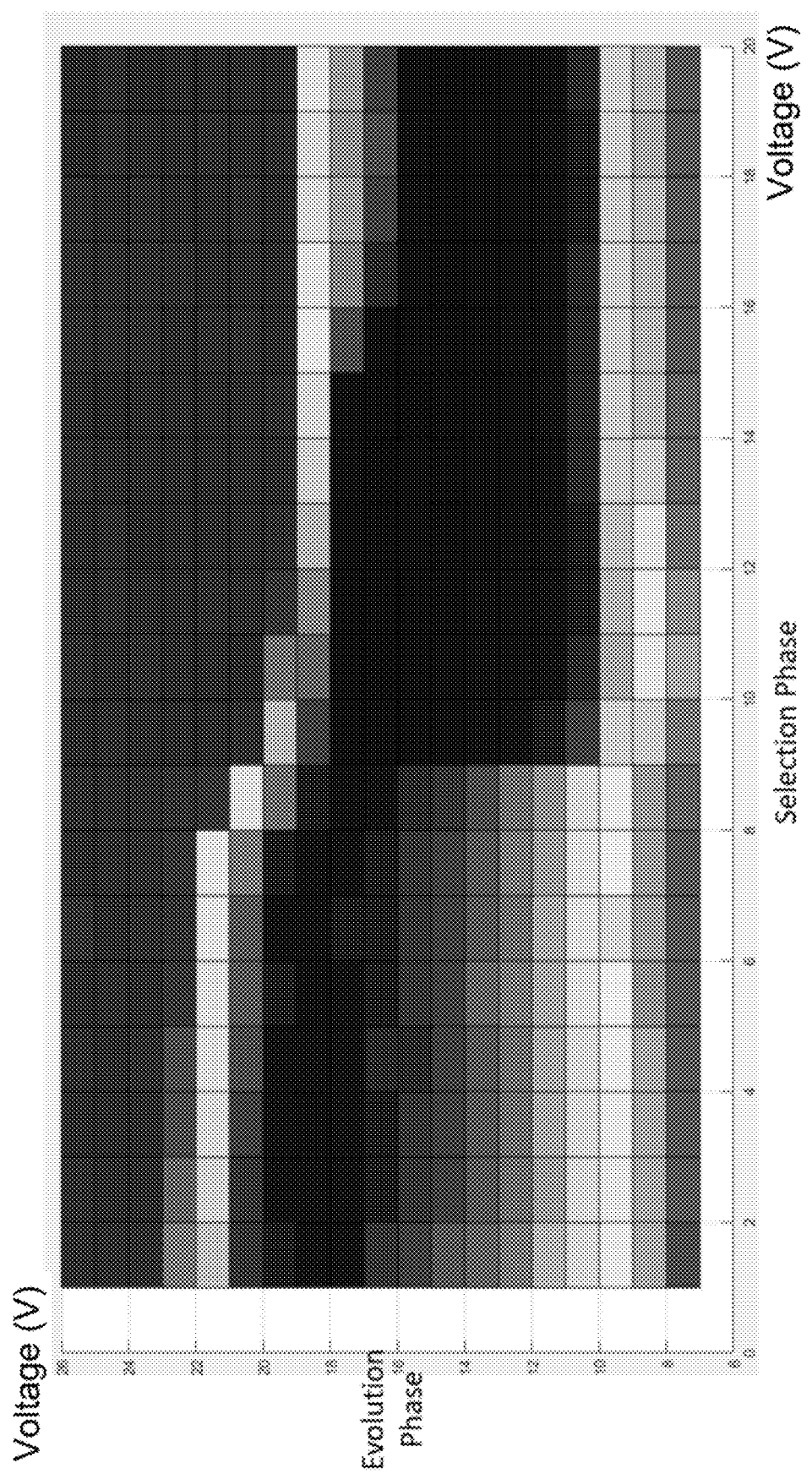
FIG. 2 is a schematic diagram of showing how driving voltages and reflectivity of the cholesteric liquid crystal display (ChLCD) change based on the Selection Phase and the Evolution Phase driving schemes while the ambient temperature is 25° C. in the prior art.
Figure 3:
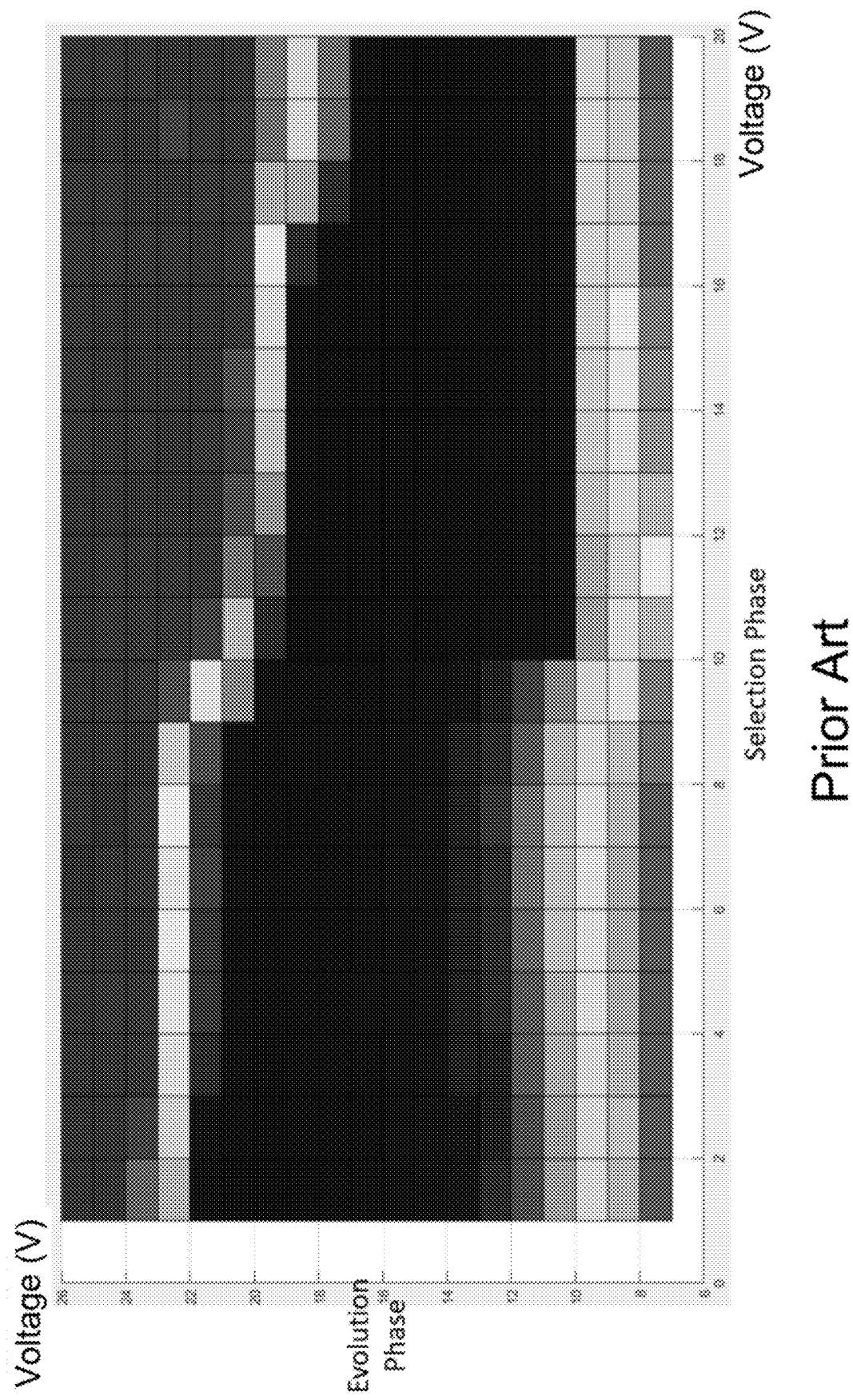
FIG. 3 is a schematic diagram of showing how driving voltages and reflectivity of the cholesteric liquid crystal display (ChLCD) change based on the Selection Phase and the Evolution Phase driving schemes while the ambient temperature is 35° C. in the prior art.

Comparing FIG. 5 with FIGS. 1-3 in the prior art, it can be concluded that if the purpose of reducing the maximum driving voltage is to be achieved, the present invention can be designed such that the cholesteric liquid crystal driving unit 36 utilizes the PWM timing mode of the PWM driving module 44 when the temperature is relatively high. Besides, the cholesteric liquid crystal driving unit 36 utilizes the DDS timing mode of the DDS driving module 42 when the temperature is relatively low.

As mentioned above, the ChLCD panel 32 performs well in the opaque state interval because it exhibits a higher contrast ratio in that interval. Comparing the range of the V2 voltage with mid-high level voltage, it can be concluded that temperatures in the range of 25 to 35° C. are deemed more appropriate, as the voltages at these temperatures are lower to provide a more stable operating environment for the ChLCD panel 32. That is, as to the ChLCD 30, the optimal temperature range may preferably be from 25 to 35° C. After conducting repeated trials and evaluating the results, it has been determined that the optimal temperature range for the V2 voltage is from 25 to 35° C. Besides, further analysis shows that the ChLCD 30 performs ideally for the V2 voltage at 30° C.

In summary, as to the ChLCD 30, the optimal temperature range may be in the range of 25 to 35° C. Besides, it has been determined that 30° C. is the optimal temperature for the ChLCD 30 when operating with the V2 voltage. This temperature provides the best overall performance, and is considered the relatively preferable optimal temperature compared to other temperatures in the range of 25 to 35° C.

Figure 6:
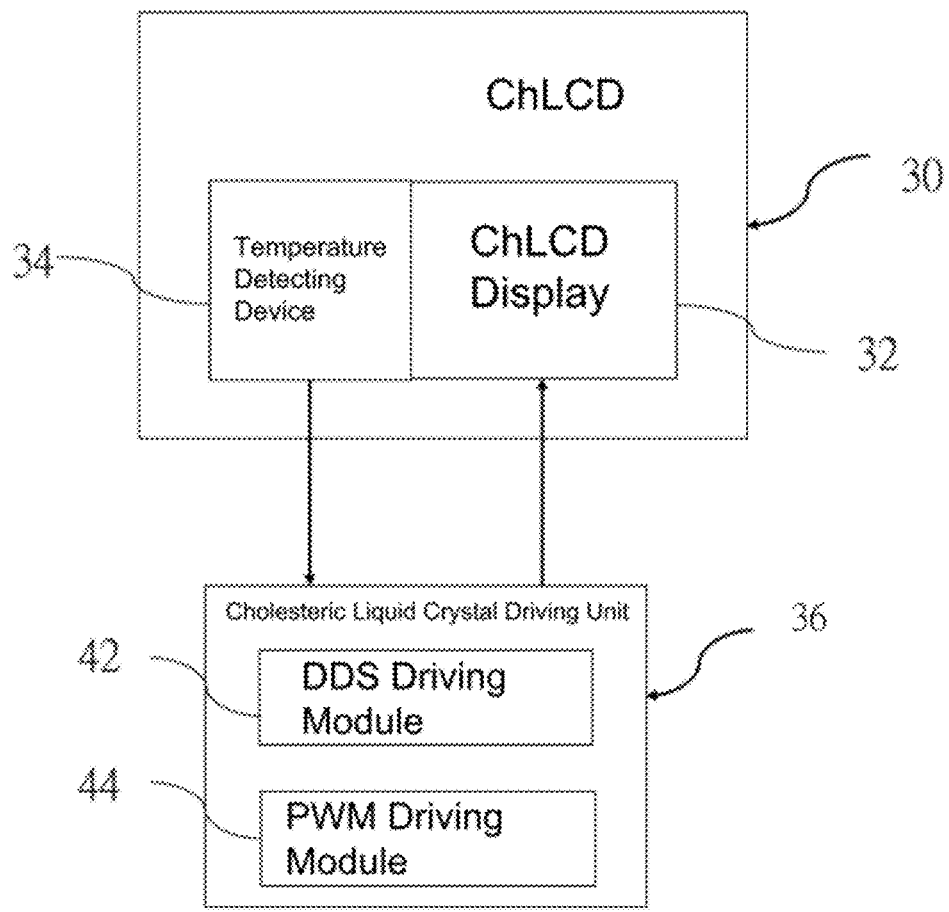
FIG. 6 is a schematic of components of the cholesteric liquid crystal driving unit with multiple timing modes according to the present invention.

Referring to FIG. 6, it illustrates a schematic of the cholesteric liquid crystal driving unit 36 with multiple timing modes according to the present invention. FIG. 6 is also another embodiment of the present invention, showing a cholesteric liquid crystal driving unit 36 with multiple timing modes that is used to reduce the maximum driving voltage of the ChLCD 30. Besides, the ChLCD 30 consists of the ChLCD panel 32 for displaying images and the temperature detecting device 34 for measuring the temperature of the ChLCD panel 32. The cholesteric liquid crystal drive unit 36 is used to supply voltages to drive the ChLCD panel 32 for displaying images, and consists of the DDS driving module 42 and the PWM driving module 44.

When the temperature detecting device 34 determines that the temperature of the ChLCD panel 32 is lower than the preset optimal temperature range, the DDS driving module 42 will drive the ChLCD panel 32 in the DDS timing mode. When the temperature detecting device 34 determines that the temperature of the ChLCD panel 32 exceeds the preset optimal temperature range, the PWM driving module 44 will drive the ChLCD panel 32 in the PWM timing mode instead.

The cholesteric liquid crystal driving unit 36 with multiple timing modes may be integrated into a timing controller (TCON) chip. Like the cholesteric liquid crystal driving unit 36 mentioned above, the optimal temperature range can be in the range of 25 to 35° C. Further, in the above-mentioned optimal temperature range, a specific temperature can also be designated as the optimal temperature. For example, the optimal temperature is preferably 30 degrees Celsius, which means that the optimal temperature range is in the range from 30 to 30° C.

Figure 7:
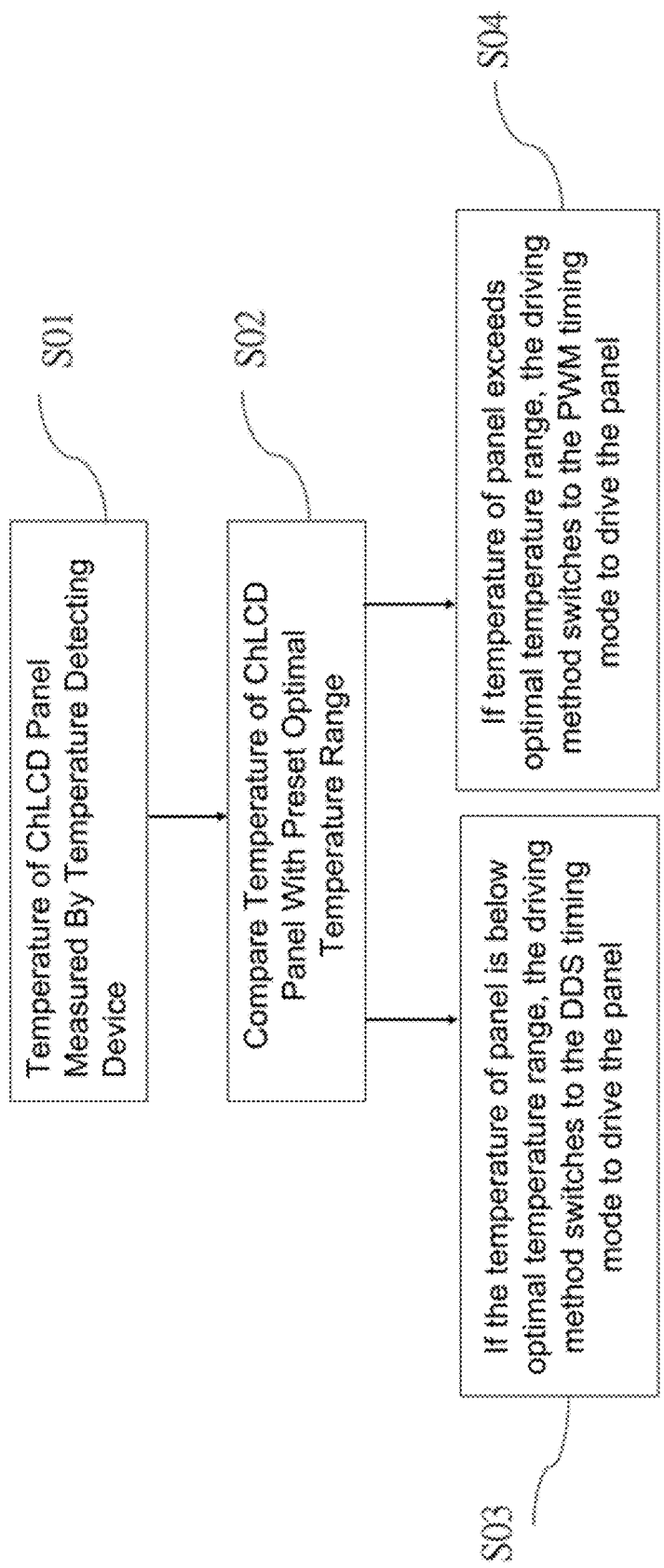
FIG. 7 is a flowchart of the driving method of the ChLCD with multiple timing modes according to the present invention.

Referring to FIG. 7, it illustrates a flowchart of the driving method of the ChLCD 30 with multiple timing modes according to the present invention. In addition to the ChLCD 30, which features multiple timing modes, and the cholesteric liquid crystal driving unit 36 to drive the ChLCD 30, the present invention further includes a driving method with multiple timing modes for the ChLCD 30. The driving method of the present invention for reducing the maximum optimal driving voltages of the ChLCD 30 that consists of the ChLCD panel 32. The driving method of the present invention includes the steps as follows.

In Step S01: Firstly, the temperature of the ChLCD panel 32 is measured by the temperature detecting device 34 and provided to the cholesteric liquid crystal unit 36 for later steps in the driving method of the present invention.

In Step S02: Subsequently, compare the temperature of the ChLCD panel 32 with the preset optimal temperature range.

In Step S03: If the temperature detected by the temperature detecting device 34 is below the preset optimal temperature range for the ChLCD panel 32, the driving method switches to the DDS timing mode to ensure proper operation of the panel.

In Step S04: If the temperature detected by the temperature detecting device 34 exceeds the preset optimal temperature range for the ChLCD panel 32, the driving method switches to the PWM timing mode to ensure proper operation of the panel.

The optimal temperature range may be in the range of 25 to 35° C. In addition, within the above-mentioned optimal temperature range, a specific temperature can also be designated as the optimal temperature. For example, the optimal temperature is 30° C., which means that the optimal temperature range is in the range from 30 to 30° C. When the temperature on the ChLCD panel 32 is high, the maximum driving voltage for driving the ChLCD panel 32 in the PWM timing mode is reduced. Similarly, even if the temperature on the ChLCD panel 32 is low, the maximum driving voltage for driving ChLCD panel 32 in the DDS timing mode remains low. Thus, the ChLCD panel 32 of the present invention is driven by the cholesteric liquid crystal driving unit 36 and the ChLCD 30 to display images. The cholesteric liquid crystal driving unit 36 is integrated into a timing controller (TCON) chip, which acts as the driver IC chip. This design ensures that the maximum driving voltage remains within safe limits and helps to reduce the cost of purchasing and operating the business.

Referring to FIG. 8, it illustrates a comparison table of the DDS timing mode and the PWM timing mode at different temperatures according to the present invention. A comparison table for the ChLCD 30, which has a resolution of 1024×768, compares the driving voltages using either the DDS or the PWM timing modes at three different temperatures 0° C., 25° C., and 35° C. The driving phase of the PWM timing mode consists of three components: Reset, Selection, and Non-Selection. The Reset portion of the driving phase lasts 60 milliseconds, and the Selection portion of the driving phase takes 1 millisecond (ins) for each of the 768 rows in the ChLCD 30's resolution. Besides, the driving phase of the DDS timing mode consists of four components: Preparation, Selection, Evolution, and Non-Selection. The Preparation portion of the driving phase lasts 20 ms, and the Selection portion of the driving phase takes 1 ms for each of the 768 rows in the ChLCD 30's resolution. Further, the Evolution of the driving phase lasts 10 ms. The voltage values in PWM or DDS driving modes vary, and the driving voltages are expressed in volts (V).

As shown in the comparison table of FIG. 8, at low temperatures, such as zero degrees Celsius (° C.), it is recommended to adjust the maximum driving voltage applied in the DDS timing mode to ensure optimal performance. Under this condition, it is recommended that the maximum driving voltage of the DDS timing mode is 35 volts (V). However, it is recommended to initially drive the ChLCD panel 32 in the DDS timing mode due to the higher maximum driving voltage of 44 volts (V) in the PWM timing mode, which is not considered optimal. In contrast, the DDS timing mode has a maximum driving voltage of 35 volts (V) that is more suitable for low temperature conditions. If the temperature rises to 25° C., the maximum required driving voltage for the DDS timing mode will also increase. At this time, the maximum driving voltage required for the DDS timing mode is 40 volts. Despite this increase, it may still be possible to maintain the DDS timing mode without switching to PWM timing mode, provided that the maximum driving voltage required for switching to PWM mode is also 40 volts. However, if the temperature continues to rise to 35° C., the maximum driving voltage for the DDS timing mode will reach 46 volts. If switching to the PWM timing mode, the maximum driving voltage will be 36 volts (V), it is recommended to use the PWM timing mode when operating the ChLCD panel 32 at higher temperatures, such as 35° C. to reduce the maximum driving voltage. For the entire temperature change process, it is preferable to indicate the ideal driving timing mode using a grid with a dotted background. Additionally, a conclusion can be reached from the data illustrated in the comparison table of FIG. 8. It shows that the DDS and PWM timing modes can be alternated when the temperature is below or exceeds 25° C.

After repeated experimentations and adjustments, it has been determined that the most suitable switching temperature occurs at 30° C. Compared to 25° C., the maximum driving voltage for both the DDS timing mode and the PWM timing mode remains at 40 Volts, and switching timing mode is not necessary. At temperatures higher than 30 degrees Celsius, such as 35° C., the maximum driving voltage for the DDS timing mode surpasses that of the PWM timing mode, which is required a switch to the PWM timing mode.

To sum up, the present invention provides the cholesteric liquid crystal display (ChLCD) 30 with multiple timing modes, the cholesteric liquid crystal driving unit 36, and the driving method. By measuring the temperature of the ChLCD panel 32, and by comparing the temperature of the ChLCD panel 32 to the optimal temperature range, either the DDS timing mode or the PWM timing mode is determined to drive the ChLCD panel 32. The issue of increased power consumption and a degraded color scale display due to high temperatures can be resolved by switching from the DDS timing mode to the PWM timing mode. The PWM mode not only reduces the maximum voltage requirement, but also produces a more accurate color display.

Referring to FIG. 9, it illustrates a comparison table of the DDS timing mode and the PWM timing mode at different temperatures according to another embodiment of the present invention. Technical descriptions for driving voltages using either the DDS or the PWM timing modes at three different temperatures 0° C., 25° C., and 35° C. are similar to counterparts shown in FIG. 8. For clarity, descriptions for DDS or the PWM timing modes at temperatures 0° C., 25° C., and 35° C. are omitted.

As to DDS and PWM timing modes at temperature −2° C., and the driving voltage at 5° C. is 43 volts (V) in PWM timing mode, but the driving voltage at the same temperature is 36 volts in DDS timing mode. From this experimental data, it seems to be a better choice to drive the ChLCD panel 32 in DDS timing mode while temperature is under 5° C. The driving voltage at −2° C. is 44 volts (V) in PWM timing mode, and is higher than that at 5° C. (43 volts (V)). However, it is not possible to drive the ChLCD panel 32 in DDS timing mode at the temperature of −2° C. due to characteristic of cholesteric liquid crystal molecule. Thus, according to this embodiment of the present invention, it is preferably that the ChLCD panel 32 is driven in PWM timing mode at temperature lower than 5° C., i.e. in the range of 0° C. to 5° C. As mentioned above, the optimal temperature range is in a range of 25 to 35° C. For the sake of distinction, the range of 25 to 35° C. is called a first optimal temperature range in this embodiment, the range of 5 to 25° C. is called a second optimal temperature range, and the range of 0 to 5° C. is called a third optimal temperature range. As also shown in FIG. 9, the first optimal temperature range may be in the range from 25 to 35° C., and an optimal temperature may be 30° C. Besides, the second optimal temperature range may be in the range from 5 to 25° C.

Figure 10:
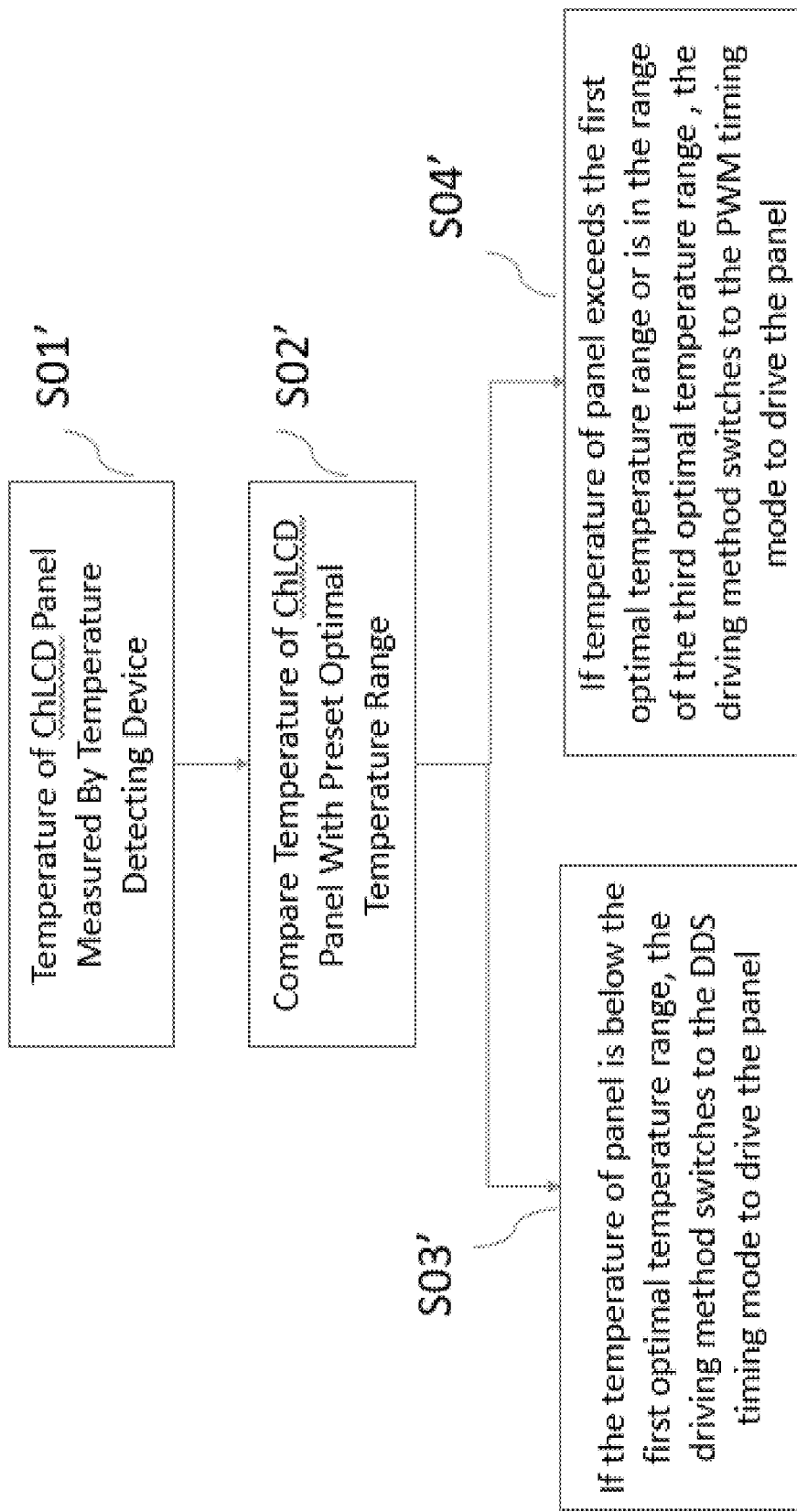
FIG. 10 is a flowchart of the driving method of the ChLCD with multiple timing modes according to another embodiment of the present invention.

Referring to FIG. 10, it illustrates a flowchart of the driving method of the ChLCD 30 with multiple timing modes according to another embodiment of the present invention. In addition to the ChLCD 30, which features multiple timing modes, and the cholesteric liquid crystal driving unit 36 to drive the ChLCD 30, the present invention further includes a driving method with multiple timing modes for the ChLCD 30. Technical descriptions for the steps S01', and S02' of the driving method in FIG. 10 are similar to those counterparts of the steps S01, and S02 of the driving method in FIG. 8. For clarity, descriptions for the steps S01' and S02' of the driving method in FIG. 10 are omitted.

As to the step S03' of the driving method in FIG. 10, if the temperature detected by the temperature detecting device 34 is in the range of the second optimal temperature range (from 5 to 35° C.) for the ChLCD panel 32, the driving method switches to the DDS timing mode to ensure proper operation of the panel.

As to the step S04' of the driving method in FIG. 10, if the temperature detected by the temperature detecting device 34 exceeds the first optimal temperature range (from 25 to 35° C.) for the ChLCD panel 32, the driving method switches to the PWM timing mode to ensure proper operation of the panel. Besides, due to characteristic of cholesteric liquid crystal molecule, it is not possible to drive the ChLCD panel 32 in DDS timing mode at the temperature of −2° C. In the step S04' of the driving method, if the temperature detected by the temperature detecting device 34 is in the range of the third optimal temperature range (from 0 to 5° C.) for the ChLCD panel 32, the driving method switches back to the PWM timing mode to ensure proper operation of the panel. Thus, it is preferably that the ChLCD panel 32 is driven in PWM timing mode in the range of the third optimal temperature range (from 0 to 5° C.) for the ChLCD panel 32. In particular, it is preferably that the ChLCD panel 32 is driven in PWM timing mode at temperature lower than 5° C., i.e. in the range of 0° C. to 5° C.

To sum up, the present invention provides the cholesteric liquid crystal display (ChLCD) 30 with multiple timing modes, the cholesteric liquid crystal driving unit 36, and the driving method. By measuring the temperature of the ChLCD panel 32, and by comparing the temperature of the ChLCD panel 32 to the first, the second, and the third optimal temperature ranges, either the DDS timing mode or the PWM timing mode is determined to drive the ChLCD panel 32. The issue of increased power consumption and a degraded color scale display due to high temperatures can be resolved by switching from the DDS timing mode to the PWM timing mode. The PWM mode not only reduces the maximum voltage requirement, but also produces a more accurate color display. Besides, due to characteristic of cholesteric liquid crystal molecule, it is not possible to drive the ChLCD panel 32 in DDS timing mode at the temperature of −2° C. If the temperature detected by the temperature detecting device 34 is below the third optimal temperature range (from 0 to 5° C.) for the ChLCD panel 32, the driving method switches back to the PWM timing mode to ensure proper operation of the panel.

The descriptions illustrated above set forth simply the preferred embodiments of the present invention; however, the characteristics of the present invention are by no means restricted thereto. All changes, alterations, or modifications conveniently considered by those skilled in the art are deemed to be encompassed within the scope of the present invention set forth by the following claims.

What is claimed is:

1. A cholesteric liquid crystal display with multiple timing modes and an optimal temperature range, for reducing maximum optimal driving voltage, comprising:
   a cholesteric liquid crystal display panel, for displaying images;
   a temperature detecting device, for measuring temperature of the cholesteric liquid crystal display panel; and
   a cholesteric liquid crystal driving unit, used to supply voltage to drive the cholesteric liquid crystal display panel to display images;
   wherein if the temperature detecting device determines that the temperature of the display panel is lower than the optimal temperature range, the cholesteric liquid crystal driving unit drives the cholesteric liquid crystal display panel by a DDS (Dynamic Driving Scheme) timing mode, and if the temperature detecting device determines that the temperature of the display panel exceeds the optimal temperature range, the cholesteric liquid crystal driving unit drives the cholesteric liquid crystal display panel by a PWM (Pulse-Width Modulation) timing mode.

2. The cholesteric liquid crystal display according to claim 1, wherein the optimal temperature range is in the range from 25 to 35 degrees Celsius.

3. The cholesteric liquid crystal display according to claim 1, wherein a specific temperature is designated as the optimal temperature in the range of the optimal temperature range.

4. The cholesteric liquid crystal display according to claim 3, wherein the optimal temperature is 30 degrees Celsius.

5. A cholesteric liquid crystal driving unit with multiple timing modes and an optimal temperature range, for reducing maximum optimal driving voltage of a cholesteric liquid crystal display which comprises a cholesteric liquid crystal display for displaying images and a temperature detecting device for measuring temperature of the cholesteric liquid crystal display panel, the driving unit comprises:
   a DDS (Dynamic Driving Scheme) driving module, driving the cholesteric liquid crystal display panel in the DDS timing module if the temperature detecting device detects a temperature of the display panel below the optimal temperature range; and a PWM (Pulse-Width Modulation) driving module, driving the cholesteric liquid crystal display panel in the PWM timing module if the temperature detecting device measures a temperature on the cholesteric liquid crystal display panel that exceeds the optimal temperature range.

6. The cholesteric liquid crystal driving unit according to claim 5, wherein the optimal temperature range is in the range from 25 to 35 degrees Celsius.

7. The cholesteric liquid crystal driving unit according to claim 5, wherein a specific temperature is designated as the optimal temperature in the range of the optimal temperature range, and the optimal temperature is 30 degrees Celsius.

8. The cholesteric liquid crystal driving unit according to claim 5, wherein the cholesteric liquid crystal driving unit is a timing controller (TCON) chip.

9. A control method with multiple timing modes for reducing maximum driving voltage and a first optimal temperature range, a second optimal temperature range, and a third optimal temperature range, a cholesteric liquid crystal display device comprising a cholesteric liquid crystal display panel for displaying image, wherein the second optimal temperature range is between the first and the third optimal temperature ranges and the first, the second, and the third optimal temperature range are not overlapped, the method comprises the steps:

measuring a temperature of the cholesteric liquid crystal display panel;

driving the cholesteric liquid crystal display panel in the DDS (Dynamic Driving Scheme) timing module if the temperature detecting device detects the temperature of the display panel in the range of the second optimal temperature range;

driving the cholesteric liquid crystal display panel in the PWM (Pulse-Width Modulation) timing module if the temperature detecting device measures the temperature on the cholesteric liquid crystal display panel that exceeds the first optimal temperature range or is in the range of the third optimal temperature range.

10. The control method according to claim 9, wherein the first optimal temperature range is in the range from 25 to 35 degrees Celsius.

11. The control method according to claim 9, wherein the second optimal temperature range is in the range from 5 to 25 degrees Celsius.

12. The control method according to claim 9, wherein the first optimal temperature is 30 degrees Celsius.

13. The control method according to claim 9, wherein the third optimal temperature range is in the range from 0 to 5 degrees Celsius.

\* \* \* \* \*